United States Patent
Choi (10) Patent No.: US 12,490,526 B2
(45) Date of Patent: Dec. 2, 2025

(54) IMAGE SENSOR, SCANNER INCLUDING THE SAME, AND METHOD OF OPERATING THE SCANNER

(71) Applicant: SAMSUNG ELECTRONICS CO., LTD., Suwon-si (KR)

(72) Inventor: Heejin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 573 days.

(21) Appl. No.: 17/843,649

(22) Filed: Jun. 17, 2022

(65) Prior Publication Data
US 2023/0178582 A1 Jun. 8, 2023

(30) Foreign Application Priority Data
Dec. 3, 2021 (KR) .................. 10-2021-0172277

(51) Int. Cl.
*H10F 39/18* (2025.01)
*G01N 21/84* (2006.01)

(52) U.S. Cl.
CPC ......... *H10F 39/182* (2025.01); *G01N 21/84* (2013.01); *G01N 2021/845* (2013.01); *G01N 2201/104* (2013.01)

(58) Field of Classification Search
CPC .............. H01L 27/14645; G01N 21/84; G01N 2021/845; G01N 2201/104
See application file for complete search history.

(56) References Cited

U.S. PATENT DOCUMENTS

| | | | |
|---|---|---|---|
| 4,922,337 A * | 5/1990 | Hunt | H04N 25/711 348/E3.018 |
| 6,958,729 B1 | 10/2005 | Metz | |
| 8,045,157 B2 | 10/2011 | Shibayama et al. | |
| 10,170,509 B2 | 1/2019 | Ockenfuss | |
| 10,902,577 B2 | 1/2021 | Nipe et al. | |
| 2009/0073281 A1* | 3/2009 | Ohno | H04N 23/84 348/E9.051 |
| 2010/0208116 A1 | 8/2010 | Iijima | |
| 2014/0061486 A1 | 3/2014 | Bao et al. | |

(Continued)

FOREIGN PATENT DOCUMENTS

| | | |
|---|---|---|
| CN | 102510451 A | 6/2012 |
| CN | 112399085 A | 2/2021 |

(Continued)

OTHER PUBLICATIONS

Pratlong et al., "TDI CMOS image sensor for Earth Observation", International Conference on Space Optics—ICSO 2018, Proc. of SPIE, Jul. 12, 2019, 12 total pages, vol. 11180.

(Continued)

*Primary Examiner* — Georgia Y Epps
*Assistant Examiner* — Don J Williams
(74) *Attorney, Agent, or Firm* — Sughrue Mion, PLLC (57) ABSTRACT

Provided is an image sensor including a plurality of pixels provided in an array, wherein each of the plurality of pixels includes a plurality of sub-pixels, and wherein the plurality of sub-pixels are provided such that electric charges, generated from pixels among the plurality of pixels provided perpendicular to a moving direction of an object, accumulate while moving in the moving direction of the object at a same speed as the object.

17 Claims, 6 Drawing Sheets

(56) References Cited

U.S. PATENT DOCUMENTS

| | | |
|---|---|---|
| 2015/0136955 A1 | 5/2015 | Wein |
| 2018/0045953 A1 | 2/2018 | Fan et al. |
| 2018/0091751 A1 | 3/2018 | Brown |
| 2018/0302605 A1* | 10/2018 | Wolke .................... G01B 11/24 |
| 2019/0049296 A1 | 2/2019 | Cho et al. |
| 2019/0086259 A1 | 3/2019 | Cho |
| 2019/0277693 A1 | 9/2019 | Kim et al. |
| 2020/0036891 A1 | 1/2020 | Aldridge et al. |
| 2020/0314983 A1 | 10/2020 | Park et al. |
| 2021/0127101 A1 | 4/2021 | Roh et al. |
| 2022/0003906 A1 | 1/2022 | Kim et al. |

FOREIGN PATENT DOCUMENTS

| | | |
|---|---|---|
| JP | 2010-192683 A | 9/2010 |
| KR | 10-2019-0049895 A | 5/2019 |

OTHER PUBLICATIONS

Communication issued Aug. 16, 2023 by the Korean Intellectual Property Office in Korean Patent Application No. 10-2021-0172277.

* cited by examiner

IMAGE SENSOR, SCANNER INCLUDING THE SAME, AND METHOD OF OPERATING THE SCANNER

CROSS-REFERENCE TO RELATED APPLICATION

This application is based on and claims priority under 35 U.S.C. § 119 to Korean Patent Application No. 10-2021-0172277, filed on Dec. 3, 2021, in the Korean Intellectual Property Office, the disclosure of which is incorporated by reference herein in its entirety.

BACKGROUND

1. Field

Example embodiments of the present disclosure relate to image scanning, and more particularly, to image sensors and scanners including the image sensors.

2. Description of Related Art

A high-resolution hyperspectral image of a fixed object may be obtained by scanning the object with a sensor having a limited field of view. In order to obtain an image having an appropriate signal-to-noise ratio (SNR), processes of stopping at a given region of the object for a constant time, obtaining an image, and moving to another region of the object are repeatedly performed. However, in this case, it requires a lot of time to acquire an entire image because a lot of time is required to mechanically move and stop the image sensor in addition to the time required to acquire the image. In particular, with respect to an object moved by a conveyor belt, it may be impossible to obtain a hyperspectral image because the repetition of the movement and stop is impossible.

SUMMARY

One or more example embodiments provide image sensors capable of obtaining a high resolution spectral image of a moving object.

One or more example embodiments also provide scanners including the image sensors.

One or more example embodiments also provide methods of operating the scanners.

Additional aspects will be set forth in part in the description which follows and, in part, will be apparent from the description, or may be learned by practice of the example embodiments of the disclosure.

According to an aspect of an example embodiment, there is provided an image sensor including a plurality of pixels provided in an array, wherein each of the plurality of pixels includes a plurality of sub-pixels, and wherein the plurality of sub-pixels are provided such that electric charges, generated in pixels among the plurality of pixels provided perpendicular to a moving direction of an object, accumulate while moving in the moving direction of the object at a same speed as the object.

The plurality of sub-pixels may be provided in a direction perpendicular to the moving direction of the object.

The plurality of sub-pixels may include at least four sub-pixels.

The at least four sub-pixels may be configured to receive light of different wavelengths.

Some of the at least four sub-pixels may be configured to receive light of a same wavelength.

The plurality of sub-pixels may be provided in a Bayer pattern.

The some of the at least four sub-pixels configured to receive the light of the same wavelength may be connected through a same wiring.

A length of each of the plurality of sub-pixels in a horizontal direction may be different than a length of each of the plurality of sub-pixels in a vertical direction.

A length of each of the plurality of sub-pixels in a direction parallel to the moving direction of the object may be greater than a length of each of the plurality of sub-pixels in a direction perpendicular to the moving direction of the object.

According to another aspect of an example embodiment, there is provided a scanner including an image sensor including a plurality of pixels provided in an array, wherein each of the plurality of pixels includes a plurality of sub-pixels, and wherein the plurality of sub-pixels are provided such that electric charges, generated in pixels among the plurality of pixels provided perpendicular to a moving direction of an object, accumulate while moving in the moving direction of the object at a same speed as the object.

The plurality of sub-pixels may be provided in a direction perpendicular to the moving direction of the object.

The plurality of sub-pixels may include at least four sub-pixels.

The at least four sub-pixels may be configured to receive light of different wavelengths.

Some of the at least four sub-pixels may be configured to receive light of a same wavelength.

The plurality of sub-pixels may be provided in a Bayer pattern.

The some of the at least four sub-pixels configured to receive the light of the same wavelength may be connected through a same wiring.

A length of each of the plurality of sub-pixels in a horizontal direction and a length of each of the plurality of sub-pixels in a vertical direction may be different from each other.

A length of each of the plurality of sub-pixels in a direction parallel to the moving direction of the object may be greater than a length of each of the plurality of sub-pixels in a direction perpendicular to the moving direction of the object.

According to yet another aspect of an example embodiment, there is provided a method of operating a scanner including an image sensor, the method including synchronizing a moving speed of electric charges, generated in a plurality of pixels provided perpendicular to a moving direction of an object, in the moving direction of the object with a moving speed of the object, wherein each of the plurality of pixels includes a plurality of sub-pixels, and wherein the plurality of sub-pixels are provided such that electric charges, generated from pixels among the plurality of pixels provided perpendicular to the moving direction of the object, accumulate while moving in the moving direction of the object at a same speed as the moving speed of the object.

BRIEF DESCRIPTION OF THE DRAWINGS

The above and/or other aspects, features, and advantages of certain example embodiments of the disclosure will be more apparent from the following description taken in conjunction with the accompanying drawings, in which:

FIG. 5 is a plan view illustrating a case in which a pixel in the sensing region of FIG. 2 has four or more sub-pixels;

FIG. 6 is a plan view illustrating a case in which a channel is formed in a sensing region through a combination of sub-pixels included in pixels of the sensing region of FIG. 2;

DETAILED DESCRIPTION

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, an image sensor, a scanner including the same, and an operation (driving) method thereof according to example embodiments will be described in detail with reference to the accompanying drawings. In the drawings, thicknesses of layers and regions may be exaggerated for clarification of the specification. In addition, example embodiments may be variously modified and may be embodied in many different forms. When an element or layer is referred to as being "on" or "above" another element or layer, the element or layer may be directly on another element or layer or intervening elements or layers. In the drawings, like reference numerals refer to like elements throughout.

Figure 1:
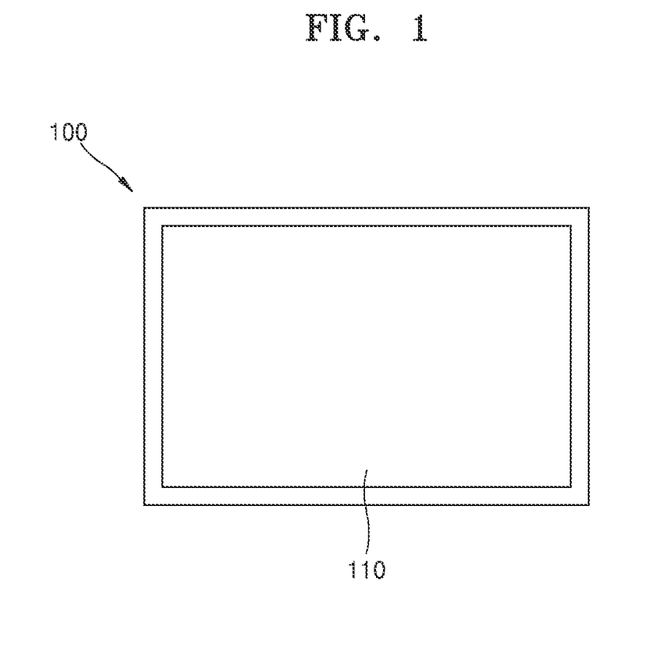
FIG. 1 is a front view of an image sensor of a spectroscopic scanner according to an example embodiment.

FIG. 1 is a diagram showing an image sensor 100 of a spectroscopic scanner according to an example embodiment.

The image sensor 100 includes a sensing region (a sensing unit) 110. The sensing region 110 is a region to which light from an object is incident, and is a region in which photoelectric conversion occurs. The sensing region 110 includes a plurality of pixels for sensing (receiving) incident light. The plurality of pixels may be provided in an array form. Because the sensing region 110 is a region in which a plurality of pixels for sensing light are provided, it may be referred to as a pixel unit or a pixel region.

Figure 2:
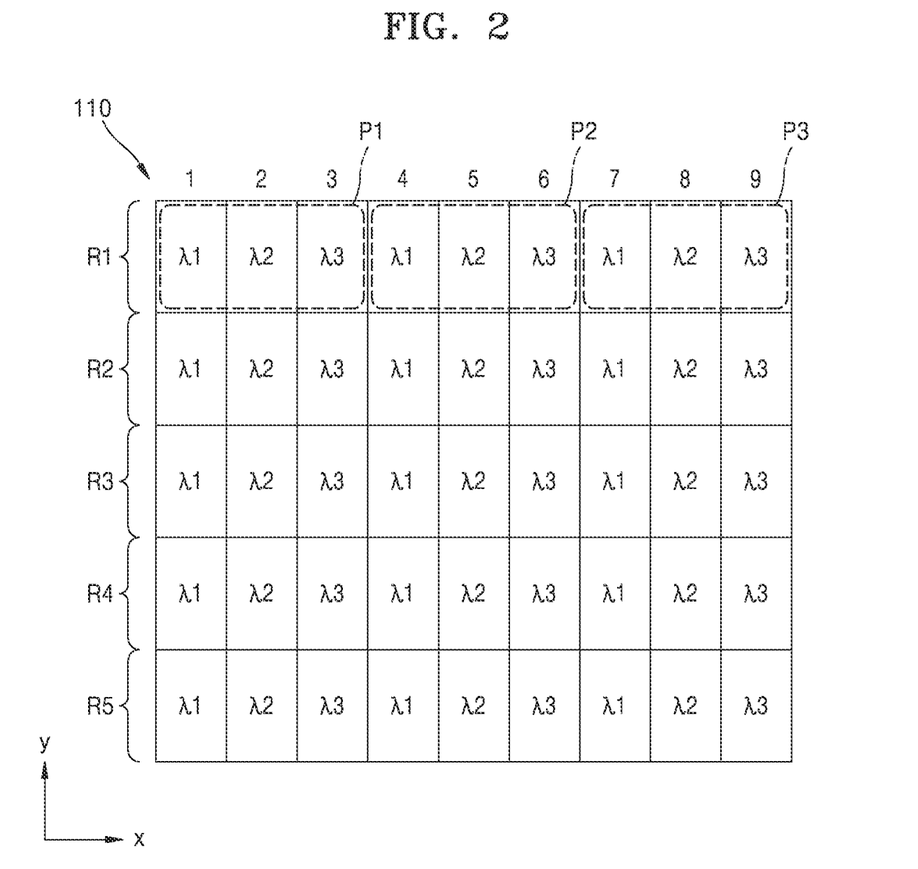
FIG. 2 is a plan view illustrating a sensing region of the image sensor of FIG. 1.

FIG. 2 shows an example of the sensing region 110.

Referring to FIG. 2, the sensing region 110 may be divided into a plurality of rows R1, R2, R3, R4, and R5 and a plurality of columns 1, 2, 3, 4, 5, 6, 7, 8, and 9. A region where a row and a column meet is a single sub-pixel region and is referred to as a sub-pixel. For example, in the sensing region 110, a region R1 and 1 located in the first row R1 and the first column 1 may be a first sub-pixel included in the first row R1, and a region R3 and 5 located in the third row R3 and the fifth column 5 is a fifth sub-pixel included in the third row R3. One sub-pixel may be a region to which one wavelength of light is incident. For example, the first sub-pixel located in a region (R1, 1) located in the first row R1 and the first column 1 may be a region to which light of a first wavelength $\lambda1$ is incident, a second sub-pixel which is a region (R1, 2) located in the first row R1 and the second column 2 may be a region to which light of a second wavelength $\lambda2$ is incident, and a third sub-pixel which is a region (R1, 3) located in the first row R1 and the third column 3 may be a region to which light of a third wavelength $\lambda2$ is incident. The first to third wavelengths $\lambda1$ to $\lambda2$ may be different wavelengths. For example, the first to third wavelengths $\lambda1$ to $\lambda2$ may be wavelengths that belong to a visible light region, an infrared region, and/or an ultraviolet region. In one row, a corresponding relationship between sub-pixels and light wavelengths may be repeated, and the number of repetitions may be the same as the number of pixels included in one row. Taking the first row R1 as an example, first to third wavelengths $\lambda1$ to $\lambda2$ may be respectively incident to the first to third sub-pixels, the first to third wavelengths $\lambda1$ to $\lambda2$ may also be incident to the fourth to sixth sub-pixels, and the first to third wavelengths $\lambda1$ to $\lambda2$ may also be incident to the seventh to ninth sub-pixels. In this case, the first to third sub-pixels constitute (be included in) one pixel (a first pixel P1), the fourth to sixth sub-pixels constitute (be included in) one pixel (a second pixel P2), and the seventh to ninth sub-pixels constitute (be included in) one pixel (a third pixel P3). As a result, one row R1 includes three pixels, that is, first to third pixels P1 to P3 sequentially arranged horizontally (in an x-axis direction). The distribution of sub-pixels in the other rows R2 to R5 may also be the same as that of the first row R1, and the other rows R2 to R5 also include three pixels sequentially and horizontally arranged. As will be described later, the number of sub-pixels included in one pixel may be three or more.

In FIG. 2, the sensing region 110 is illustrated as including five rows R1 to R5, but embodiments are not limited thereto, and may include less or more than five rows. In addition, in FIG. 2, although it is illustrated that nine columns 1 to 9 are included in each row R1 to R5 of the sensing region 110, each row R1 to R5 may include more than nine columns.

Figure 3:
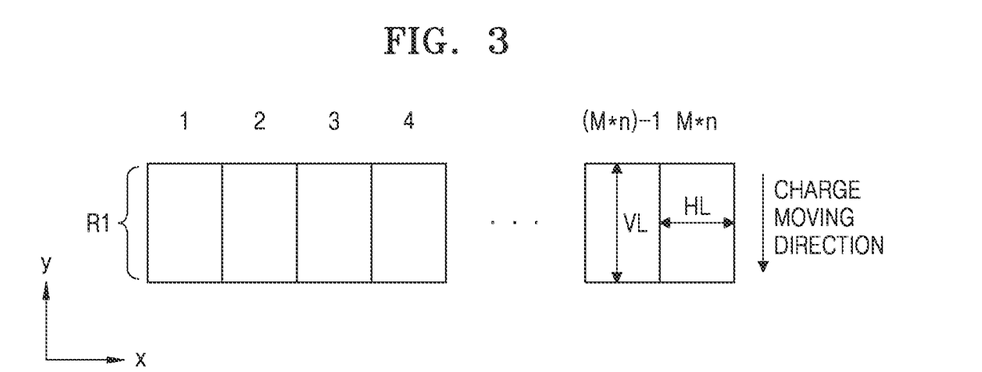
FIG. 3 is a plan view illustrating a case in which one row includes a plurality of columns in the sensing region of FIG. 2.

Taking the first row R1 as an example, as shown in FIG. 3, the first row R1 may include M*n columns. For example, the first row R1 may include M*n sub-pixels, where M and n are natural numbers, such as 1, 2, 3 . . . M denotes the number of sub-pixels included in one pixel, and n denotes the number of pixels included in one row R1. For example, when M is 5 and n is 10, M*n is 50, which indicates that the number of columns (the number of sub-pixels) included in one row R1 is 50, one pixel includes five sub-pixels, and 10 pixels each including five sub-pixels exist in one row R1. When M is 3 and n is 3, M*n is 9, which means that the number of columns included in one row R1 is 9 as shown in FIG. 2, one pixel includes three sub-pixels, and the first row R1 includes three pixels each including three sub-pixels.

The number of sub-pixels included in one pixel may be arbitrarily determined in the process of designing the sensing region 110. For example, when the image sensor 100 is a typical color image sensor, one pixel may be designed to include three or four sub-pixels accommodating red light R, green light G, and blue light B. In one example, when the image sensor 100 is a spectral or hyperspectral image sensor, one pixel may have a structure including 4 or more sub-pixels, for example, 12, 16, or 20 or more sub-pixels to sense light of wavelengths other than R, G, and B. Accordingly, when the image sensor 100 is a hyperspectral image sensor and the pixel structure of the sensing region 110 is designed to sense hyperspectral image, the pixels included in each row of the sensing region 110 may sense wavelengths having various spectra that may not be sensed by conventional R, G, and B color pixels from an infrared band to an ultraviolet band. For example, in designing a pixel structure of each row of the sensing region 110, the number and distribution of sub-pixels disposed in each pixel may be designed so that each pixel senses a wavelength belongs to an infrared band together with R, G, and B, a wavelength between R and G, and a wavelength between G and B. The distribution of sub-pixels for each pixel will be described later.

As shown in FIGS. 2 and 3, the shape of the sub-pixel when viewed from a front (from a light incident side) may be a quadrangle, but embodiments are not limited thereto, and when the shape of the sub-pixel is a quadrangle, a horizontal length HL and a vertical length VL of the sub-pixel may be different from each other. For example, the sub-pixel may have a rectangular shape, but when considering that electric charges (e.g., electrons) generated in sub-pixels by photoelectric conversion move in a direction perpendicular to each row R1 to R5 (in a direction perpendicular to an x-axis, that is, in a direction parallel to the y-axis), the vertical length VL may be greater than the horizontal length HL.

Figure 4:
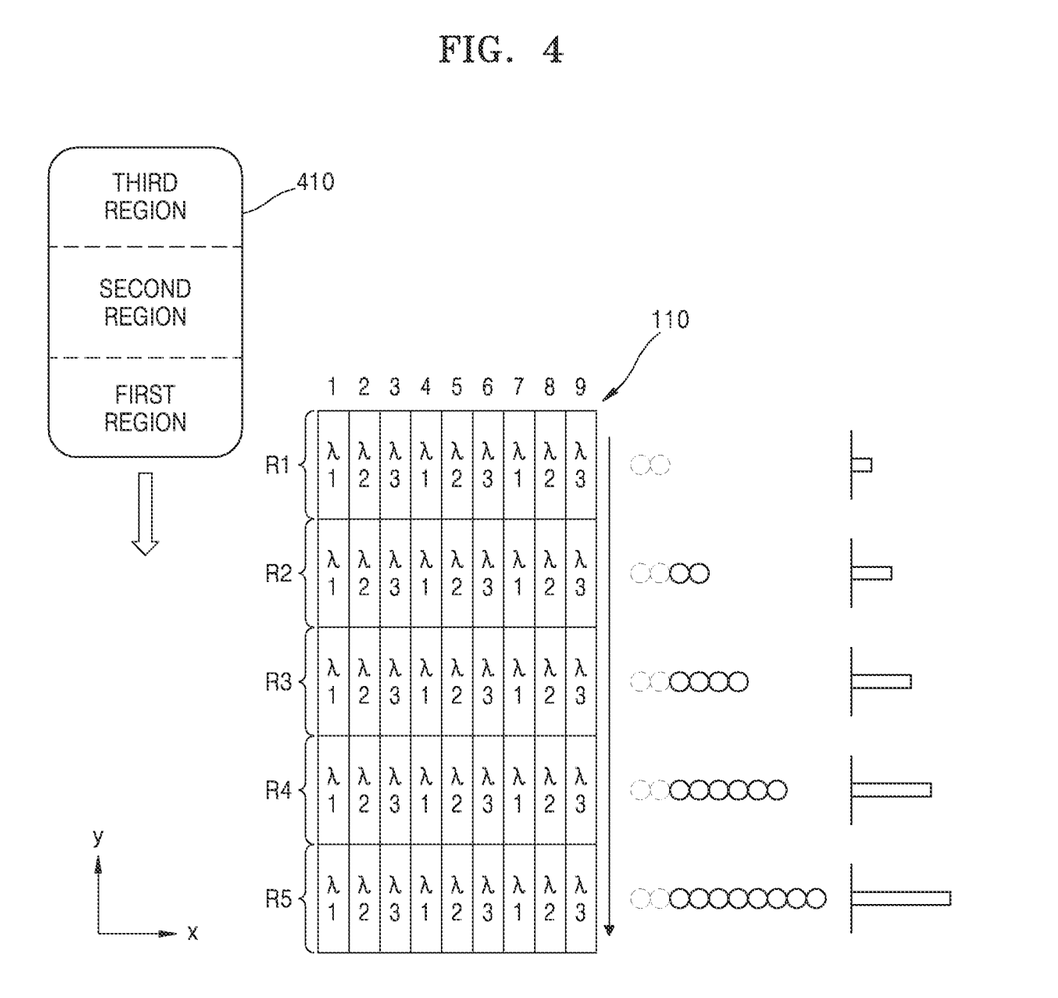
FIG. 4 is a diagram for explaining a process of acquiring an image of an object by using an image sensor including the sensing region of FIG. 3.

FIG. 4 is a diagram illustrating a process of acquiring an image of an object 410 by using the image sensor 100 including the sensing region 110 of FIG. 3. This process may correspond to an operation (image sensing operation) of the image sensor 100.

In FIG. 4, circles on the right side of the sensing region 110 symbolically represent electric charges. An arrow 4AR in a direction perpendicular to the X-axis indicates a direction of movement of the electric charges. To facilitate understanding of the description, it is assumed that two charges are generated in each row R1 to R5 of the sensing region 110 with respect to the same region (part) of the object 410. The charges may be electrons generated as a result of photoelectric conversion. Among the circles, dotted circles indicate charges generated in a corresponding row, and solid circles indicate charges generated in the previous row. For example, four circles correspond to the second row R2, that is, among the four circles, two solid circles indicate that the charges generated in the first row R1 are moved to the second row, and the two dotted circles are charges generated in the second row R2. 10 circles correspond to the fifth row R5, and among the 10 circles, 8 solid circles represent charges generated in the four rows R1 to R4 (that is, the charges accumulated by moving up to the fourth row R4), and the two dotted circles represent charges generated in fifth row R5. A horizontal peak to the right of the circles represents the accumulation of electric charges represented by the circles.

The accumulation of electric charges generated in the immediately preceding row is a result of synchronizing the moving speed of the electric charges with the moving speed of the object 410. The synchronization denotes that the speed that the electric charges (dotted line circles) generated in each row are moved to the lower row matches with the moving speed of the object 410. Such synchronization may be achieved through an operation of a driving unit (circuit) with respect to the image sensor 100 or an operation of the image acquisition scanner including the image sensor 100, for example, the synchronization is possible by operating a driver of the image sensor 100 or a scanner in a time delay integration (TDI) mode which is a time delay mode. In the TDI mode, the moving speed of the object 410 may be sensed, and the moving speed of electric charges generated in each row R1 to R5 of the sensing region 110 is set to be the same as the moving speed of the object 410. As a result of this, electric charges generated in each row R1 to R5 move at the same speed as the moving speed of the object 410 in a moving direction (negative y-axis direction) of the object 410 perpendicular to each row R1 to R5.

In this way, by synchronizing the moving speed of the object 410 and the moving speed of electric charges generated in each row R1 to R5, electric charges generated while the same region (e.g., the first region) of the object 410 is sequentially sensed (scanned) in the first to fifth rows R1 to R5 is accumulated as shown on the right side of the circles in FIG. 4. The sequential sensing denotes that the object 410 is continuously moved without stopping. The accumulation of the electric charges denotes that spectral information or hyperspectral information on the first region of the object 412 is continuously collected (accumulated). For example, the accumulation of the electric charges suggests that the same region of the object 412 is continuously scanned (photographed) for a given time. The given time corresponds to a value obtained by dividing a moving distance of the electric charges by a moving speed of the electric charges.

As described above, as the same region of the object 410 is continuously scanned for a given time, a signal-to-noise ratio (SNR) of the spectral or hyperspectral information for the corresponding region of the object 410 is increased. As a result, the resolution of the spectral or hyperspectral image with respect to the corresponding region of the object 410 may be increased.

The sensing region 110 also functions on remaining regions, for example, the second region and the third region of the object 410 in the same manner as that of the first region. For example, the above results with respect to the first region of the object 410 may be the same with respect to the remaining regions (second and third regions) of the object 410.

As a result, when the image sensor 100 according to an example embodiment is used, a hyperspectral image of the object 410 with high resolution without stopping the moving object 410 may be obtained.

In FIG. 4, the pixels included in each row R1 to R5 include three sub-pixels, but as described in FIG. 3, each pixel may be a spectral pixel for spectral or hyperspectral image sensing by including four or more sub-pixels. In this case, the sensing region 110 of FIG. 4 may sense a spectral or hyperspectral image, and the image sensor 100 may be a spectral or hyperspectral image sensor.

For example, the number of sub-pixels included in each pixel in one row (e.g., R1) of the sensing region 110 may be the same, but a wavelength spectrum incident to each pixel may be different. For example, each pixel may express a different spectrum. For example, a plurality of sub-pixels included in some pixels may be configured to be more sensitive to a first wavelength than other pixels, and a plurality of sub-pixels included in some pixels may be configured to be more sensitive to a second wavelength than other pixels.

FIG. 5 shows an example of the configuration of the plurality of sub-pixels included in some pixels according to an example embodiment.

Referring to FIG. 5, the first to third pixels P1 to P3 in the first row R1 may all include a same number (five) of sub-pixels. When light of a first wavelength $\lambda_1$, a second wavelength $\lambda_2$, a third wavelength $\lambda_3$, a fourth wavelength $\lambda_4$, and a fifth wavelength $\lambda_5$ is incident on the sensing region 110, wavelengths different from each other are incident on five sub-pixels included in the first pixel P1, respectively, and thus, the first pixel P1 may have the same sensitivity to each of the first to fifth wavelengths $\lambda_1$ to $\lambda_5$. The second pixel P2 has a structure in which the first wavelength $\lambda_1$ is incident on two sub-pixels among the five sub-pixels, the second wavelength $\lambda_2$ is incident on the other two sub-pixels, and the third wavelength $\lambda_2$ is incident on the remaining one sub-pixel. Accordingly, the second pixel P2 may have relatively greater sensitivity for sensing the first wavelength $\lambda_1$ and the second wavelength $\lambda_2$ than the third wavelength $\lambda_3$. The case of the third pixel P3 has a structure in which, among the five sub-pixels included therein, the second wavelength $\lambda_2$ is incident on two sub-pixels, the fifth wavelength $\lambda_5$ is incident on the other two sub-pixels, and the third wavelength $\lambda_2$ is incident on the remaining one sub-pixel. Accordingly, the third pixel P3 may have relatively greater sensitivity for sensing the second and fifth wavelengths $\lambda_2$ and $\lambda_5$ than the third wavelength $\lambda_3$. For example, the first to fifth wavelengths $\lambda_1$ to $\lambda_5$ may be wavelengths that belong to a visible light region, an infrared region, and/or an ultraviolet region.

This characteristic of FIG. 5 may be applied to the other rows R2 to R5 of the sensing region 110 in the same or similar manner. For example, as shown in FIG. 6, all sub-pixel combinations of the third pixel P3 in the second to fifth rows R2 to R5 may be configured to be the same as the sub-pixel combination of the third pixel P3 in the first row R1. In this case, a first channel SC1 and a second channel SC2 that are particularly sensitive to the second wavelength $\lambda_2$ and the fifth wavelength $\lambda_5$ may be formed in the sensing region 110.

Because light of different wavelengths may be incident on the sub-pixels included in each of the pixels P1 to P3 of the sensing region 110, light incident on the plurality of sub-pixels included in one pixel may form a spectrum. Accordingly, each sub-pixel may be expressed as a spectral pixel.

According to another example embodiment, the image sensor 100 may include a second sensing region having a pixel structure different from that of the sensing region (first sensing region) 110 described in FIGS. 1 to 6.

Figure 7:
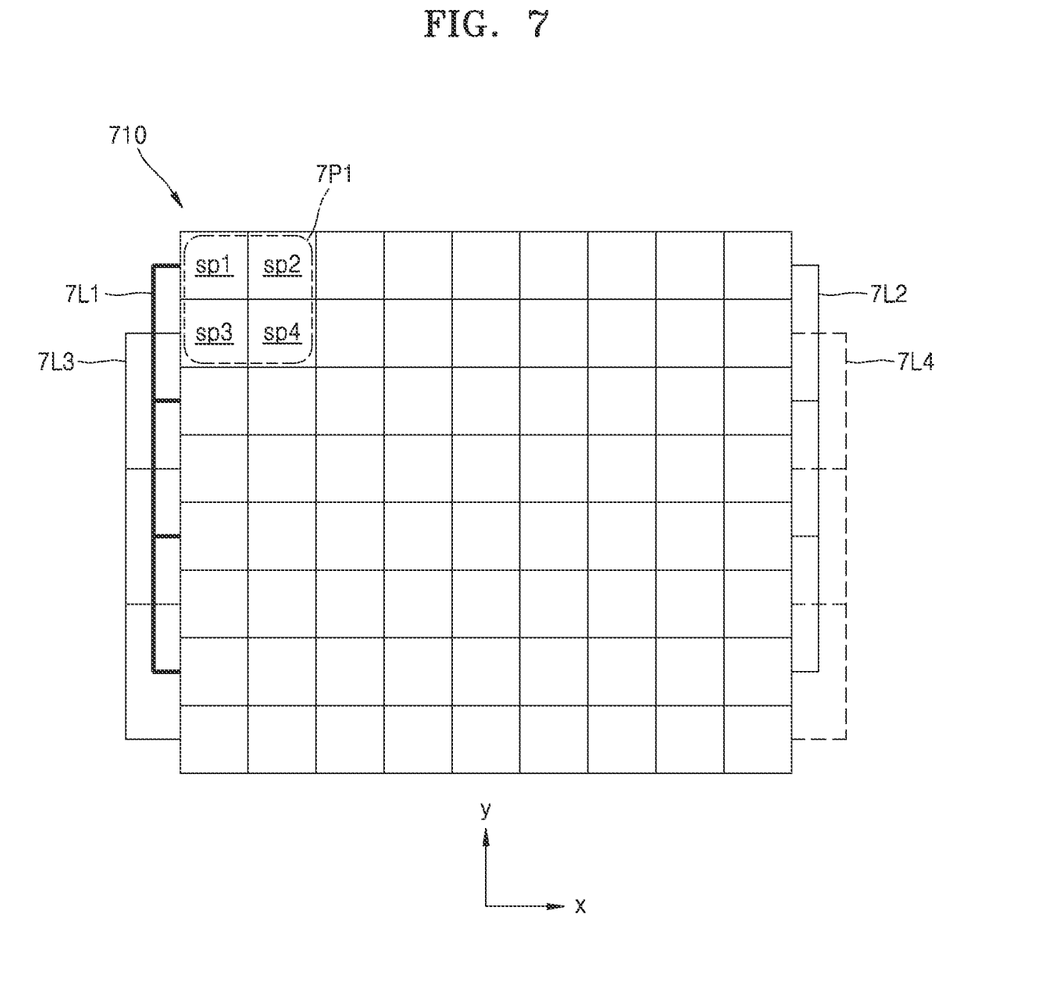
FIG. 7 is a plan view illustrating a second sensing region that may be used to replace the sensing region of FIG. 2.

FIG. 7 shows an example of a second sensing region 710 according to an example embodiment.

Referring to FIG. 7, the second sensing region 710 includes a plurality of pixels 7P1 that are repeated horizontally and vertically. Each of the pixels 7P1 includes a first sub-pixel sp1, a second sub-pixel sp2, a third sub-pixel sp3, and a fourth sub-pixel sp4 forming a Bayer pattern. The first sub-pixel sp1 receives red light R, the second and third sub-pixels sp2 and sp3 receive green light G, and the fourth sub-pixel sp4 receives blue light B receive In FIG. 4, as the first sensing region 110 is operated in the TDI mode when scanning the object 410, the TDI mode may also be applied when the object 410 is scanned through the second sensing region 710. When the TDI mode is applied to the second sensing region 710, the movement of generated electric charges may be different from that of the first sensing region 110.

For example, electric charges generated in a specific sub-pixel of each of the pixels 7P1 are moved in a moving direction of the object 410, but as the sub-pixels sp1 to sp4 of each of the pixels 7P1 are not horizontally arranged in a row, but has a Bayer pattern structure, specific sub-pixels are not continuously arranged in the moving direction of the object 410. For example, when the specific sub-pixel is the first sub-pixel sp1, the first sub-pixel sp1 is not followed by the first sub-pixel sp1 in the moving direction of the object 410, but after the first sub-pixel sp1, a third sub-pixel sp3 that provides scan information different from that of the first sub-pixel sp1 is present. Accordingly, information scanned in the first sub-pixel sp1, that is, electric charges generated in the first sub-pixel sp1 may not be moved to the third sub-pixel sp3.

Accordingly, in the second sensing region 710, electric charges generated in a specific sub-pixel of each of the pixels 7P1 in the process of scanning the same region of the object 410 may be moved through wirings 7L1, 7L2, 7L3, and 7L4 connecting specific sub-pixels of each of the pixels 7P1. The first wiring 7L1 is a wiring connecting the first sub-pixel sp1 of each of the pixels 7P1 in the moving direction of the object 410, the second wiring 7L2 is a wiring connecting the second sub-pixel sp2 of each of the pixels 7P1 in the moving direction of the object 410, the third wiring 7L3 is a wiring connecting the third sub-pixel sp3 of each of the pixels 7P1 in the moving direction of the object 410, and the fourth wiring 7L4 is a wiring connecting the fourth sub-pixel sp4 of each of the pixels 7P1 in the moving direction of the object 410. Electric charges generated in the first to fourth sub-pixels sp1 to sp4 of each of the pixels 7P1 are accumulated while moving in the moving direction of the object 410 at the same speed as the moving speed of the object 410 through each wiring 7L1 to 7L4. This result is a result of continuously scanning the same region (e.g., the first region) of the object 410 for a given time without stopping the movement of the object 410, and is the same as the result of scanning the object 410 by using the first sensing region 110.

In the sensing regions 110 and 710 described above, each sub-pixel may include a filter for receiving only light of a specific wavelength.

According to another example embodiment, instead of moving the object, the object may be fixed and the object may be scanned by moving an image sensor at the same speed as the object, that is, the fixed object may be scanned by moving the scanner. In this case, because a relative speed of the object with respect to the scanner is the same as in the case when only the object is moved, the same result as in the case when the object is moved may be obtained.

Figure 8:
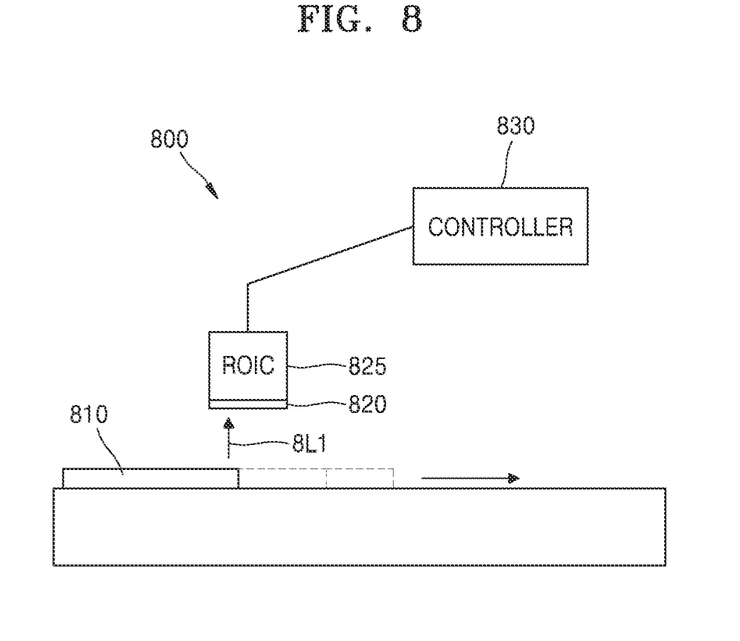
FIG. 8 is a schematic cross-sectional view illustrating an image scanner according to an example embodiment.

FIG. 8 shows a spectroscopic or hyperspectral image scanner 800 according to an example embodiment.

Referring to FIG. 8, the hyperspectral image scanner 800 includes an image sensor 820, a readout IC (ROIC) 825, and a controller 830. The image sensor 820 may include the first sensing region 110 or the second sensing region 710 described with reference to FIGS. 2 to 7. The ROIC 825 may read out an electrical signal provided from the image sensor 820 and transmit the electrical signal to the controller 830, and may include a driving circuit configured to control an operation of the image sensor 820 based on a control signal provided from the controller 830. The controller 830 is configured to control operations of the image sensor 820 and the ROIC 825, and control overall operations of the hyperspectral image scanner 800. In addition, the controller 830 may include a memory configured to store an algorithm or program for controlling the operation of the image sensor 820 in a specific mode (e.g., TDI mode). The controller 830 may also include a display for displaying a scan result of an object 810. Reference numeral 8L1 denotes light incident from the object 810 to the image sensor 820. The controller may include a simple controller, a microprocessor, a complex processor such as a central processing unit (CPU), a processor configured by software, or dedicated hardware or firmware. For example, the controller and the processor may be implemented by a general-use computer or an application-specific hardware component such as a digital signal processor (DSP), a field programmable gate array (FPGA), or an application-specific integrated circuit (ASIC).

The image sensor for acquiring a spectral image according to example embodiments has a pixel structure capable of continuously moving electric charges in a moving direction of an object, and in a driving method of the image sensor, a moving speed of electric charges is synchronized with a moving speed of the object.

Accordingly, a scan time for the same region of the moving object may be increased, and thus a signal-to-noise ratio for the corresponding region may be increased. In addition, with respect to a fixed object, the same result as when the object is moved may be obtained by synchronizing the moving speed of the electric charges with the moving speed of a sensor while moving the image sensor.

As a result, a spectral image having a high resolution for a moving object and a stationary object may be obtained.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. An image sensor comprising:
a plurality of pixels arranged in an array,
wherein each pixel of the plurality of pixels comprises a plurality of sub-pixels,
wherein the plurality of sub-pixels are arranged such that electric charges, generated in pixels, among the plurality of pixels, arranged perpendicular to a moving direction of an object, accumulate while moving in the moving direction of the object at a same speed as the object,
wherein the plurality of sub-pixels comprise at least three sub-pixels arranged in a direction perpendicular to the moving direction of the object, and
wherein all of the plurality of sub-pixels are arranged in a line in the direction perpendicular to the moving direction of the object.

2. The image sensor of claim 1, wherein the plurality of sub-pixels comprises at least four sub-pixels.

3. The image sensor of claim 2, wherein the at least four sub-pixels are configured to receive light of different wavelengths.

4. The image sensor of claim 2, wherein some of the at least four sub-pixels are configured to receive light of a same wavelength.

5. The image sensor of claim 1, wherein the plurality of sub-pixels are arranged in a Bayer pattern.

6. The image sensor of claim 5, wherein, in the plurality of pixels, a first sub-pixel of a first pixel is connected to a first sub-pixel of a second pixel through a first wiring, a second sub-pixel of the first pixel is connected to a second sub-pixel of the second pixel through a second wiring, and a third sub-pixel of the first pixel is connected to a third sub-pixel of the second pixel through a third wiring, and
wherein the first sub-pixels are configured to receive light of a first wavelength, the second sub-pixels are configured to receive light of a second wavelength different from the first wavelength, and the third sub-pixels are configured to receive light of a third wavelength different from the first and second wavelengths.

7. The image sensor of claim 1, wherein a length of each sub-pixel of the plurality of sub-pixels in a horizontal direction is different than a length of each sub-pixel of the plurality of sub-pixels in a vertical direction.

8. The image sensor of claim 1, wherein a length of each sub-pixel of the plurality of sub-pixels in a direction parallel to the moving direction of the object is greater than a length of each sub-pixel of the plurality of sub-pixels in the direction perpendicular to the moving direction of the object.

9. A scanner comprising:
an image sensor comprising:
a plurality of pixels arranged in an array,
wherein each pixel of the plurality of pixels comprises a plurality of sub-pixels,
wherein the plurality of sub-pixels are arranged so that electric charges, generated in pixels, among the plurality of pixels, arranged perpendicular to a moving direction of an object, accumulate while moving in the moving direction of the object at a same speed as the object,
wherein the plurality of sub-pixels comprise at least three sub-pixels arranged in a direction perpendicular to the moving direction of the object, and
wherein all of the plurality of sub-pixels are arranged in a line in the direction perpendicular to the moving direction of the object.

10. The scanner of claim 9, wherein the plurality of sub-pixels comprises at least four sub-pixels.

11. The scanner of claim 10, wherein the at least four sub-pixels are configured to receive light of different wavelengths.

12. The scanner of claim 10, wherein some of the at least four sub-pixels are configured to receive light of a same wavelength.

13. The scanner of claim 12, wherein the some of the at least four sub-pixels configured to receive the light of the same wavelength are connected through a same wiring.

14. The scanner of claim 9, wherein the plurality of sub-pixels are arranged in a Bayer pattern.

15. The scanner of claim 9, wherein a length of each sub-pixel of the plurality of sub-pixels in a horizontal direction is different than a length of each sub-pixel of the plurality of sub-pixels in a vertical direction.

16. The scanner of claim 9, wherein a length of each sub-pixel of the plurality of sub-pixels in a direction parallel to the moving direction of the object is greater than a length of each sub-pixel of the plurality of sub-pixels in the direction perpendicular to the moving direction of the object.

17. A method of operating a scanner comprising an image sensor, the method comprising:
synchronizing a moving speed of electric charges, generated in a plurality of pixels arranged perpendicular to a moving direction of an object, in the moving direction of the object with a moving speed of the object,
wherein each of the plurality of pixels comprises a plurality of sub-pixels, wherein the plurality of sub-pixels are arranged such that electric charges, generated in pixels, among the plurality of pixels, arranged perpendicular to the moving direction of the object, accumulate while moving in the moving direction of the object at a same speed as the moving speed of the object, wherein the plurality of sub-pixels comprise at least three sub-pixels arranged in a direction perpendicular to the moving direction of the object, and wherein all of the plurality of sub-pixels are arranged in a line in the direction perpendicular to the moving direction of the object.

\* \* \* \* \*